(12) United States Patent
Hymel et al.

(10) Patent No.: US 8,825,781 B2
(45) Date of Patent: Sep. 2, 2014

(54) METHOD AND SYSTEM FOR ALERTING UNOPENED ITEMS IN COMMUNICATIONS

(75) Inventors: James Allen Hymel, Kitchener (CA); Jean Philippe Bouchard, Waterloo (CA); Janine Mary Hodder, Waterloo (CA)

(73) Assignee: BlackBerry Limited, Waterloo (CA)

( * ) Notice: Subject to any disclaimer, the term of this patent is extended or adjusted under 35 U.S.C. 154(b) by 193 days.

(21) Appl. No.: 13/407,823

(22) Filed: Feb. 29, 2012

(65) Prior Publication Data

US 2013/0227029 A1    Aug. 29, 2013

(51) Int. Cl.
*G06F 15/16*    (2006.01)

(52) U.S. Cl.
USPC ....................................................... 709/206

(58) Field of Classification Search
USPC ........................ 709/204, 206, 207
See application file for complete search history.

(56) References Cited

U.S. PATENT DOCUMENTS

2005/0220064 A1*  10/2005  Hundscheidt et al. ........ 370/342
2008/0162651 A1*   7/2008  Madnani ...................... 709/206
2009/0106365 A1    4/2009  Drory et al.
2009/0177617 A1*   7/2009  Lee .................................. 707/1
2010/0153505 A1    6/2010  Oh et al.

FOREIGN PATENT DOCUMENTS

EP    0813161 A2    12/1997

OTHER PUBLICATIONS

Extended European Search Report dated May 31, 2012 issued by the European Patent Office relating to European Patent Application No. 12157440.4.

* cited by examiner

*Primary Examiner* — Larry Donaghue
*Assistant Examiner* — Marshall McLeod
(74) *Attorney, Agent, or Firm* — Gowling Lafleur Henderson LLP (57) ABSTRACT

The present matter relates to a method and system for alerting unopened items in communications, particularly attachments and external resources referenced (e.g. Uniform Resource Locators (URLs) or other Uniform Resource Identifiers (URIs), etc.), in communications such as email or meeting invite messages. The alerting may be triggered by a meeting reminder, telephone communication, search or other event. Alerting may be to senders, recipients or both.

22 Claims, 5 Drawing Sheets

METHOD AND SYSTEM FOR ALERTING UNOPENED ITEMS IN COMMUNICATIONS

FIELD

The present matter relates to a method and system for alerting unopened items in communications, particularly attachments and external resources referenced (e.g. Uniform Resource Locators (URLs) or other Uniform Resource Identifiers (URIs), etc.), in communications such as email, meeting invite messages, etc.

BACKGROUND

Communications such as email and other messages may include or reference additional items for a communication recipient to open and review. Such items may include attachments to the communication and references to external resources. Often external resources are referenced via a URL or other URI in the communication (e.g. subject line or message body). Communication viewers such as email applications typically permit the recipient communication device to open attachments for reviewing or invoke the URL to open the external resource for reviewing.

BRIEF DESCRIPTION OF THE DRAWINGS

In order that the subject matter may be readily understood, embodiments are illustrated by way of examples in the accompanying drawings, in which.

For convenience, like numerals in the description refer to like structures in the drawings.

DETAILED DESCRIPTION

The present matter relates to a method and system for alerting unopened items in communications, particularly attachments and external resources referenced (e.g. Uniform Resource Locators (URLs) or other Uniform Resource Identifiers (URIs), etc.), in communications such as email or meeting invite messages. The alerting may be triggered by a meeting reminder, telephone communication, search or other event. Alerting may be via either sender communication devices, recipient communication devices or both.

There is provided a first computer implemented method aspect of alerting unopened items in communications. The first method comprises: sending electronically for delivery to a recipient communication device a communication having at least one item to be opened; tracking whether the at least one item is opened; and in response to a trigger, alerting, via a sender communication device, that one or more items sent for delivery to the recipient communication device remain unopened.

The method may comprise sending electronically for delivery to the recipient communication device a reminder communication to open said items remaining unopened. The trigger may be one of: a meeting reminder for a meeting between a contact associated with the sender communication device and a contact associated with the recipient communication device; and a search for one or more items remaining unopened by the recipient.

The method may comprise determining the items to be opened from the communication, for example, where fewer than all of the items are to be tracked.

Tracking may comprises updating a status of a respective one of said at least one item in response to receiving a status update message.

A communication may comprise one of an email or meeting invite message and a respective item to be opened may be one of an attachment or external resource.

Device and computer program product (e.g. memory) aspects are also disclosed corresponding to the first method aspect.

There is provided a second computer implemented method aspect of alerting unopened items in communications. This aspect comprises: receiving electronically a communication from a sender communication device having at least one item to be opened by a recipient communication device; tracking whether the at least one item is opened; and in response to a trigger, alerting, via the recipient communication device, that one or more items remaining unopened.

The method may comprise receiving electronically a reminder communication to open said items remaining unopened.

Trigger may be one of: a meeting reminder for a meeting between a contact associated with the sender communication device and a contact associated with the recipient communication device; a telephone call from a contact associated with the sender communication device; and a search for one or more items remaining unopened.

The method may comprise determining the items to be opened from the communication, for example, where fewer than all of the items are to be tracked.

Tracking may comprise opening a respective one item of said at least one item and updating a status of the respective one item in response to the opening. A status message may be sent electronically for the respective one item for updating a respective status tracked for the sender communication device.

A communication may comprise one of an email or meeting invite message and a respective item to be opened may be one of an attachment or external resource.

Device and computer program product (e.g. memory) aspects are also disclosed corresponding to the second method aspect.

Figure 1:
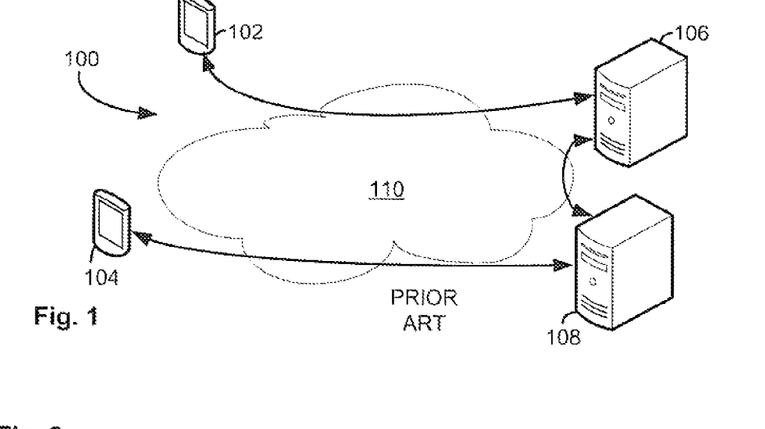
FIG. 1 is a block diagram illustrating components of a communication system, albeit simplified and according to the prior art, which may be adapted for alerting unopened communication items.

FIG. 1 is a block diagram illustrating components of a simplified communication system 100 according to the prior art, which may be adapted for alerting unopened communication items. A sender communication device is configured to send for delivery to a recipient communication device 104 communications such as email, meeting invite messages, etc. (not shown). The communications may comprise communication items for opening by a recipient communication device 104, where such items may comprise attachments and references to external sources. Attachments typically accompany the message, in some communication systems, the attachments may not be delivered to the recipient communication device unless requested by such device (e.g. to save bandwidth, etc.). Attachments may be delivered via an attachment server (not shown). Attachments may comprise documents, images, audio/video, other communications (e.g. attached email), short cuts or references to external resources (e.g. a reference which when invoked retrieves a document from a document management store, an URL short cut, etc.). The message may comprise a reference to an external resource in a message subject line or message body. For example, an URL or URI or other link which when invoked by an application, file system or operating system of the recipient communication device opens the external resource. "External" in this sense then means that the resource is external to the communication. The external resource may be locally or remotely stored relative to the recipient communication device.

Communication servers 106 and 108 are representative of mail or other servers for delivering communications between sender communication device 102 and recipient communication device 104 via network 110 which may be public, private or both. In one configuration, the servers may represent servers within a same enterprise or organization, for example, where sender communication device and recipient communication device are operated by users associated with the same enterprise or organization. Typically, sender communication device 102 and recipient communication device 104 are configured with client applications for communicating and the servers are configured with server applications for the same purpose. It is also understood that when communicating between each other, the servers 106 and 108 may notionally be considered clients and servers with respect to each other in certain contexts. It will further be apparent that while the embodiments herein describe operations for alerting unopened communication items chiefly in terms of operations by the respective sender communication device 102 and recipient communication device 104, many such operations may be performed on their respective behalves by one or both of the servers 106 and 108. As communication system 100 is simplified, additional communication servers, gateways, network infrastructure, etc. is omitted.

Though not shown, additional communication devices may be present in communication system 100 such that a communication device may communicate with a plurality of other devices, sometimes sending the same message for delivery to more than one other communication device (e.g. via a message with multiple recipients). Though sender communication device 102 is referenced as a sending device and recipient communication device 104 as a receiving device, the roles may be reversed when recipient communication device 104 sends a communication for delivery to sender communication device 102. Thus both devices are configured for sending and receiving modes as described herein below.

Figure 2:
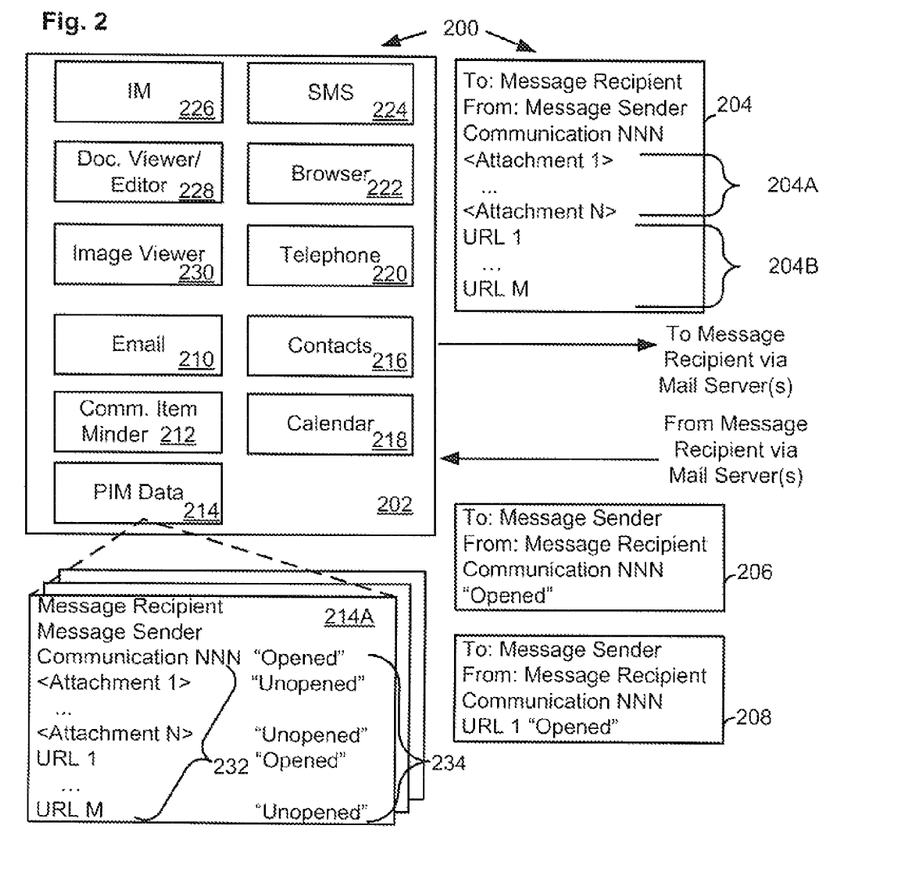
FIG. 2 is a block diagram illustrating a portion of a communication device and messages in accordance with an example embodiment for alerting unopened communication items.

FIG. 2 is a block diagram illustrating a memory 202 of sender communication device 102 and communications 204, 206, 208 (collectively, the memory and messages are 200) in accordance with an example embodiment for alerting unopened communication items. It is understood that recipient communication device 104 is similarly configured.

Memory 202 comprises RAM/ROM or other storage of sender communication device 102 for storing instructions and data such as applications or other components for configuring operations thereof described further below. Memory 202, by way of example, stores email application 210, communication item minder component 212 (which may be integrated into email application 210 or other applications sending communications with items to be opened), personal information manager data 214 such as email, calendar and contacts data, contacts application 216 and calendar application 218. Typically these applications 210, 216 and 218 may form a personal information manager suite and are often tightly integrated for cooperative operation. These applications on sender communication device 102 work cooperatively with server applications (not shown) on server 106. Some representative PIM data 214 is also shown and will be described below. For example, meeting invite messages for meetings between contacts associated with the respective sender communication device 102 and recipient communication device 104 may be sent via email. Moreover, these message invites may include attachments and external resource references. A sender of such a message may desire to know whether the attachments and external resources have been opened prior to such a meeting and may wish to remind the recipient.

Memory 202 further stores one or more applications for opening attachments and external resources as well as other communication applications. For example, telephone application 220 is provided, which may also be integrated closely with the PIM applications such as sharing contacts in PIM data 214. Browser 222 may be invoked to view Internet or other content via URL/URIs. Short message service application 224 is available for texting and also may share contacts. Instant messaging application 226 also may share contacts and may communicate attachments or external resource references. Document viewer/editor 228 may open a document for viewing and/or editing. Image viewer 230 may view an image such as a picture or graphic. Other applications not shown that may be stored are audio/video players and presentation document players, among others.

Communication 204 represents an email message or meeting invite message for delivery to recipient communication device 104. It comprises sender and recipient information and a plurality of attachments 204A and references to external resources (e.g. URLs) 204B. At least some of these communication items 204A and 204B are to be opened by the message recipient (e.g. by the recipient communication device 104). The message sender desires to know that the items to be opened have been opened (and may also want to know that the communication was opened). PIM data 214A represents data for tracking the open/unopened status of the communication 204 and its respective items 204A and 204B. Item data 232 is representative of the items to be opened and status data 234 their respective status. PIM data 214A may be established (e.g. initially stored by communication item minder 212 in a sending mode working on outgoing communications) when communication 204 is sent and status data 234 updated (e.g. stored by communication item minder 212) in response to communications 206 and 208 received with status updates for the communication 204 itself and one of the communication items 204B. These status update messages need not be emails per se but may be other signaling messages. In a receiving mode, working on incoming communications (e.g. at recipient communication device 104), communication item minder 212 may similarly establish corresponding PIM data 214 to track the opening of communication items 204A and 204B. Typically email applications are configured to invoke the opening of attachments and external resources, often using application programming interfaces (APIs) to other applications (e.g. 222, 228, 230) configured to present the attachments and external resources in accordance with their respective type. Communication item minder 212 is configured to respond to an opening and/or invocation of the communication item, to update the status (e.g. in local or server stored status data (e.g. at server 108) and to send status update message for delivery to the sender communication device 102 (and/or server 106).

Persons of skill in the art will appreciate that PIM data 214A may be stored in association with the sent communication 204 and may be searched, sorted and/or viewed by "message sender" and "message recipient" (i.e. as keys). Data representing message sender and message recipient may be a name, email address or other address typical of contact data. However, a formal contact data item for either may not be stored in PIM data 214. For example, communication item minder 212 may configure email application 210 to permit a user to search and present all unopened items a) sent to a particular message recipient or b) received from a particular message sender. The search alerts of the unopened items, on demand, as a user invoked alert. Communication item minder 212 may configure email application 210 to perform such a search and presentation automatically as an automatic alert. The alert may be automatically performed in response to a trigger like a meeting reminder for a meeting between the message sender and message recipient. The trigger may be another communication from the message sender (i.e. contact associated with the message sender), such as a telephone call, SMS, etc.

In an automatic alert trigger by an event associated with a message sender (e.g. meeting reminder or new communication from the sender), only unopened items from a message sender may be presented. These items may be presented in a list form (not shown) for example, and prioritized such as by date. If prompted by a meeting reminder, unopened items received for the meeting (e.g. with the invite message) may be prioritized.

In some embodiments, the alert may present the items remaining unopened in a list which permits invocation of the opening of individual items. In some embodiments the alert may comprise a list of the communications which have one or more items remaining to be opened, which communications may be opened from the list. In some embodiments the alert may comprise a list of the communications which have one or more items remaining unopened as well as the items and permit opening of any of same from the list.

Though equivalent entries in item data 232 are illustrated for each of items 204A and 204B, it may be that not all of the items sent are to be tracked. For example, in many email signatures URLs, etc. may be included that are not intended to be opened each time an email is sent between the sender and recipient. Communication item minder 212 may parse the communication and filter out some of the items to determine the items to be opened. A policy (set of rules) may be defined to filter out some common items, for example by matching.

It may be preferred, in some embodiments, to only determine items to be opened that are items in an communications originating from the sender or in a new portion of a communication originating from the sender. For example, when replying to an earlier email, the sender may be replying with a new portion as well as a copy of the earlier email. The sender may only wish to track items to be opened that are in the new portion of the email. The sender may track items in the earlier email as a recipient. Similarly, forwarded emails by a sender may be handled to track items in new portions only in some embodiments. In yet a further embodiment, operations of communication item minder 212 may be configured to only determine items to be opened for tracking status that are associated to communications sent to the recipient as a primary recipient (i.e. not as a cc or bcc recipient). Operations of communication item minder 212 in recipient mode may be similarly configured when determining items to be opened. A common policy in an enterprise to filter out certain items may assist the tracking and alert operations.

Though described chiefly with reference to email, it is understood that IM or other message applications may be similarly configured.

It is understood that certain operations may be performed by servers 106 or 108. For example, determining the items to be opened, storing item and status data for tracking same, updating status, searching item and status data and providing alert information for presenting by the respective communication devices may be performed by the servers to reduce some burdens on the communication devices. Status messages from a recipient device updating communication open status or item open status may be directed to servers only.

In some embodiments, such as an enterprise based solution (not shown), a common server for sender communication device 102 and recipient communication device 104 may be configured to track the open/unopened status of the communication items. The item data and status data may be shared such that each communication device need not maintain respective data. The common server may receive the email from sender communication device 102 for delivery to recipient communication device 104. Equivalent PIM data 214A may be established. Items to be opened (those to be tracked) may be determined using a policy/rules etc. In response to the opening of a communication item at a recipient communication device 104, a status update message may be sent to the server which in turn updates the open status for the particular item. The server may be configured to present alerts of unopened items, for example upon receiving a search request from or for a communication device. The search request may be triggered by a request from a communication device or generated by the server such as in response to a meeting reminder, telephone call, etc. Communication item minder 212 of a sender communication device 102 may be configured to receive a meeting reminder signal and send a search request to the server for unopened items (e.g. from those communication items sent to a meeting participant). Communication item minder 212 may receive the alert and present same via the sender communication device 102. Recipient communication device 104 may be similarly configured.

FIGS. 3A, 3B, 4A, 4B, 4C, 5A, 5B, 6A and 6B are flowcharts showing operations for alerting unopened communication items. The operations described relate to the embodiment of FIG. 2 in that each respective communication device maintains tracking data for communications and communication items sent and received by the respective device. Modifications of these operations to adapt same to the server-based embodiment described above are within the knowledge of a person of skill in the art.

Figures 3A, 3B:
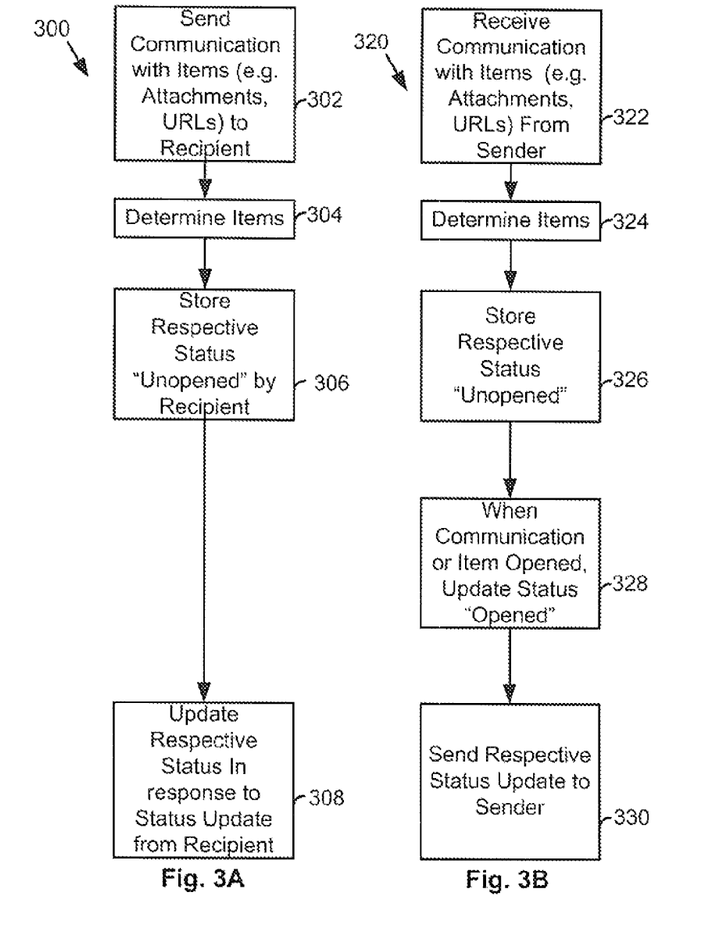
FIGS. 3A, 3B, 4A, 4B, 4C, 5A, 5B, 6A and 6B are flowcharts showing operations for alerting unopened communication items.

FIGS. 3A and 3B represent operations 300 and 320 of sender communication device 102 and recipient communication device 104 respectively to send and receive a communication with items to be opened and to track the opening. At 302, sender communication device 102 sends communication 204 with Items (e.g. Attachments 204A, URLs 204B) to recipient communication device 104. For simplicity only a single recipient is described herein though tracking and alerting may be configured for communications sent to multiple recipients.

At 304, the communication items to be opened and tracked are determined. PIM data 214 is established (at 306), storing respective status data representing an unopened status by recipient communication device 104. In response to a status update received from recipient communication device, PIM Data 214 (respective status data 234) is updated (at 308).

At 322 recipient communication device 104 receives communication 204 with Items (e.g. Attachments, URLs) from sender communication device 102. The communication items to be opened and tracked are determined at 324. corresponding PIM data is established at 326, storing respective status data representing an unopened status for each communication item. At 328, when the communication or a respective item is opened, an update to the status data is made representing an opened status. A status update message is sent for delivery to sender communication device 102.

In some embodiments, there may be implemented privacy and/or preference settings to configure whether status update messages are sent. For example, a setting may comprise the following options: don't send any status update, automatically send all status updates; or prompt to send status update>Policies or other rules, etc., may enforce a status update sending option. For communications within an enterprise, a policy may require that status updates are automatically sent while for those communications from outside an enterprise, the policy may permit selectively sending (e.g. via a prompt or permission list of domains) or not sending a status update.

Figures 4A, 4B:
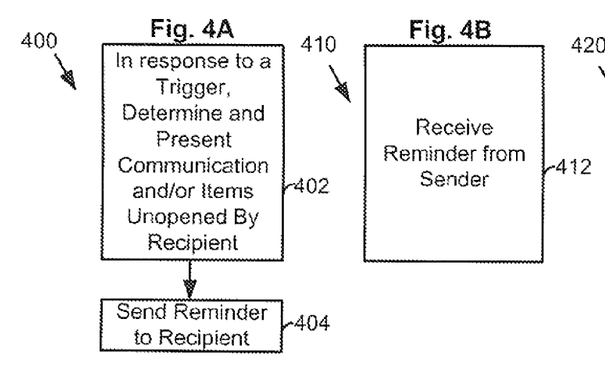
Figure 4C:
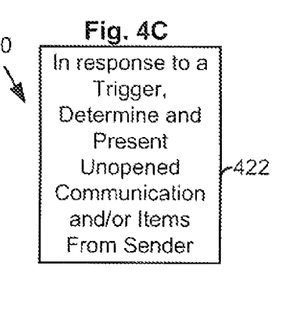

FIGS. 4A, 4B and 4C represent operations 400, 410 and 420 of sender communication device 102 and recipient communication device 104 to present an alert of unopened items. At 402, sender communication device 102 receives a trigger to present the alert. The unopened items are determined (e.g. via a search of PIM Data) and the alert is presented. The alert may take different forms (not shown). For example a pop-up may inform that the recipient has unopened items and enable click through to view those items (not shown) or enable the sending of a reminder for delivery to the recipient communication device 104 (at 404). Operations 410 show recipient communication device 104 receiving the reminder delivered from sender communication device 102. Triggered alert operations for recipient communication device 104 are shown at 422 which are similar to operation 402. Typically, a reminder communication is not sent by the recipient to the sender.

Figure 5A:
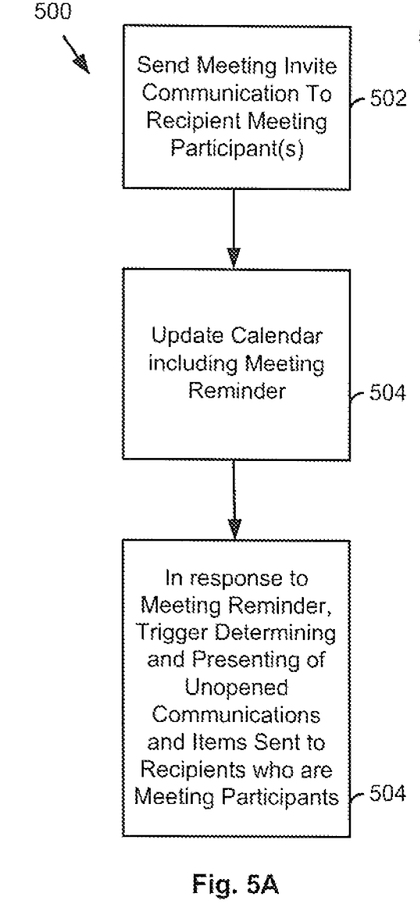
Figure 5B:
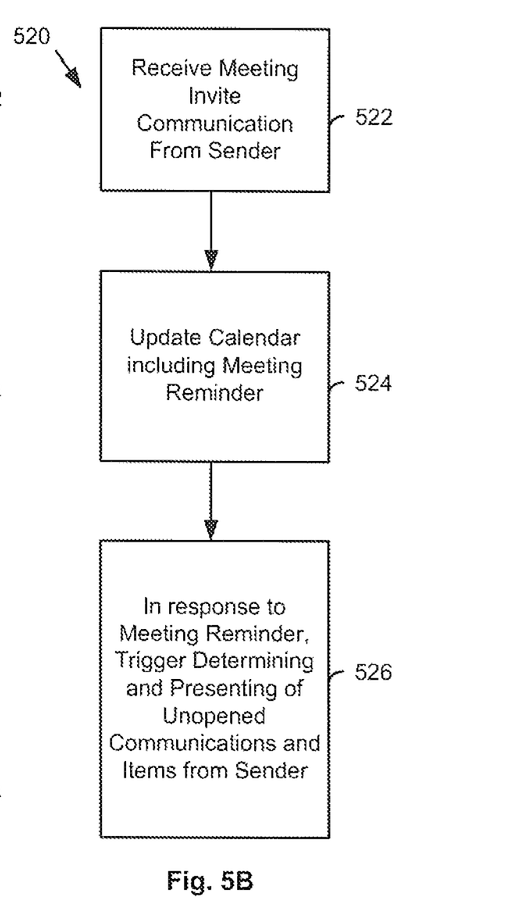

FIGS. 5A and 5B illustrate operations 500 and 520 where the trigger for the alert is a meeting reminder. At 502, a meeting invite message is sent for delivery to recipient communication device 104. At 504 the calendar is updated (e.g. in PIM Data and server 106 but elements thereof are not shown) including a meeting reminder. At 506 the meeting reminder is triggered which in turn triggers the alert at 508. It is noted that the alert may be configured as a part of the meeting reminder alert. For example, the meeting reminder alert may include an option to view unopened items sent to meeting participant and/or send reminder re: unopened items to meeting participant. Similarly operations 522, 524 and 526 show method for alerting at recipient communication device 104. It is understood that as respective communication devices may be both sending and receiving communications, they may be configured to alert items that were received and are unopened and that were sent and unopened, for example where both meeting participants are exchanging communications with items for the meeting. In other embodiments, the respective alerts may only relate to items sent by the meeting organizer (in the present example, sending communication device 102).

Figure 6A:
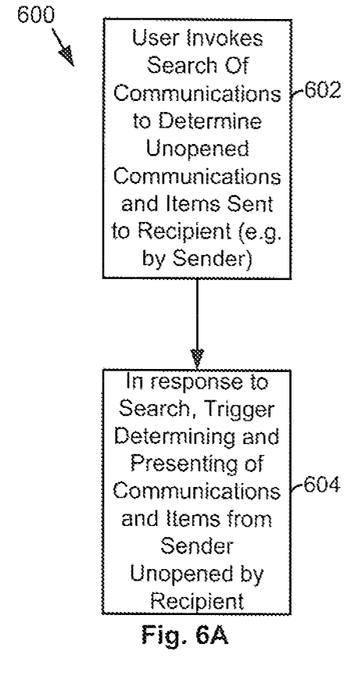
Figure 6B:
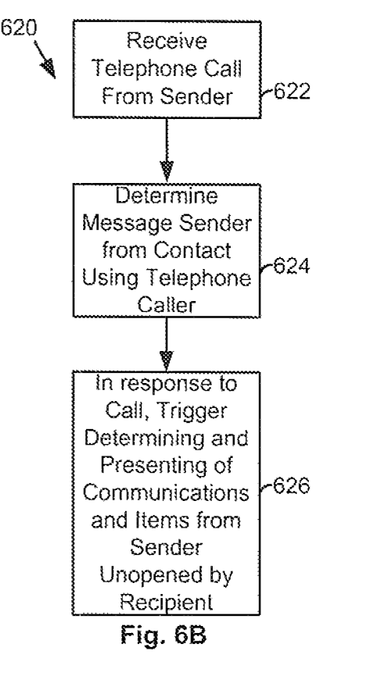

FIGS. 6A and 6B illustrate additional examples of triggering events such as a search (operations 600) and a telephone call (operations 622). Either or both of sender communication device 102 and recipient communication device 104 may be configured to operate as shown. However, operations 600 are described with reference to sender communication device 102 and operations 620 with reference to recipient communication device 104. At 602, a search of unopened items is invoked at sender communication device 102 to determine unopened items (and communications) sent to recipient communication device 104. In response to the search, an alert is triggered to indicate whether items remain unopened. As noted above, the items may be presented. A reminder may be sent (not shown).

At 622 a telephone call is received at recipient communication device 104 from sender communication device 102. For example, via contacts application 216, a contact in PIM data associated with the incoming telephone number may be determined (624) (or a remote contact store may be searched for same). The contact may have an email address (i.e. for searching message sender data of PIM data 214A) with which to search for communications and items which remain unopened. In response to the call and determination of the contact, the determining of unopened items is triggered and a consequent alert is presented (626).

Figure 7:
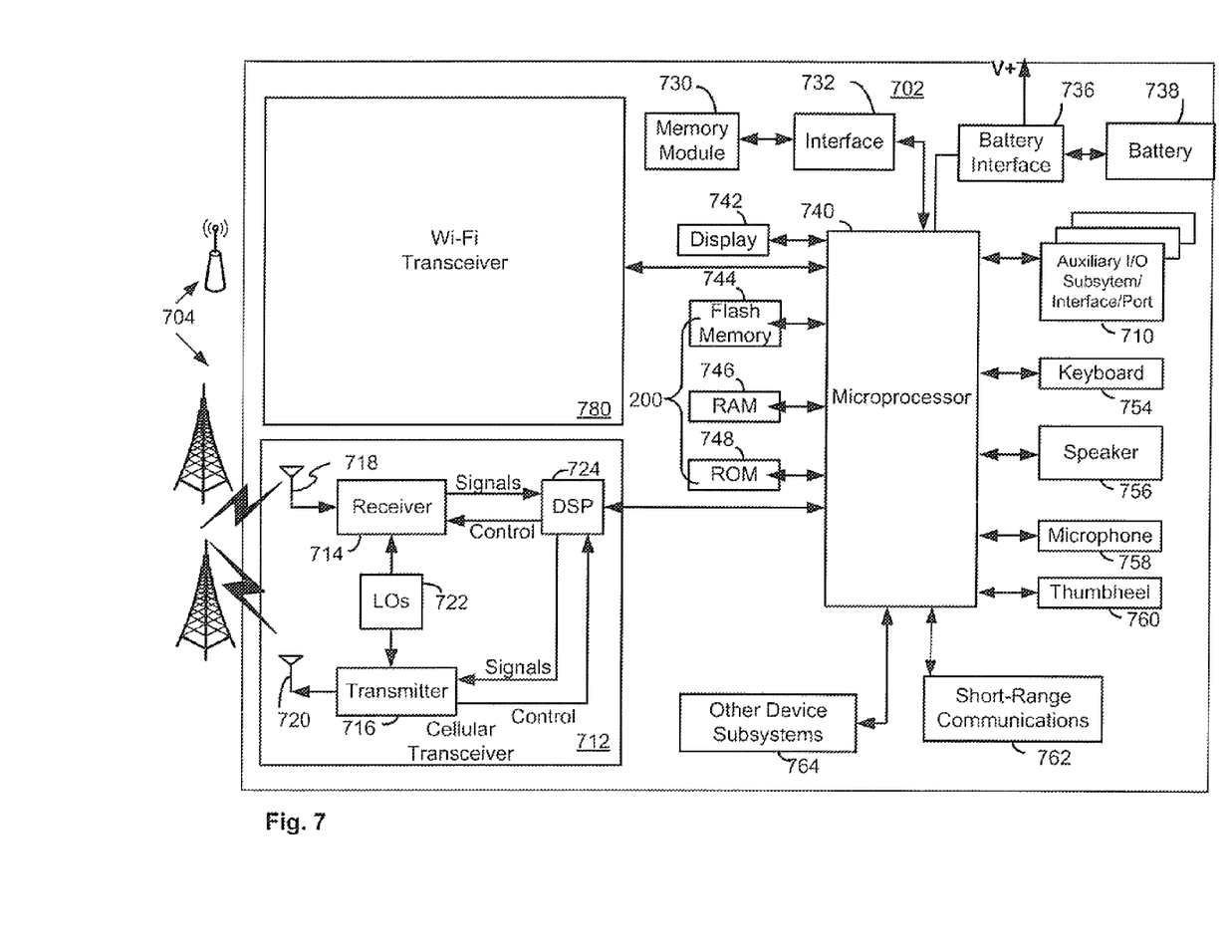
FIG. 7 is a block diagram of an example communication device adapted for alerting unopened communication items.

FIG. 7 is a block diagram of an example communication device 702 adapted for alerting unopened communication items that is suitable to be configured as sender communication device 102 and/or recipient communication device 104. Device 702 is illustrated with wireless communication capabilities and in particular example embodiments communicates through a communication network 704. Network 704 is also illustrated with wireless capabilities and includes antenna, base stations, and supporting radio equipment for supporting wireless communications between device 702 and other devices connected to network 704. Network 704 may be connected to a network gateway and to a wide area network such as to define network 110 of FIG. 1.

In one example embodiment, device 702 is a two-way communication device having at least data and/or voice communication capabilities, including the capability to communicate with other computer systems. In particular example embodiments, device 702 is a mobile device. Depending on the functionality provided by device 702, it may be a data messaging device, a two-way pager, a cellular telephone with data messaging capabilities, a wireless Internet appliance, a data communication device (with or without telephony capabilities), a smartphone, personal digital assistant, a portable media, a music player, a tablet or a laptop. In some example embodiments device 702 is a desktop computer or a server. More generically, it may be a computing device.

Device 702 may communicate with any one of a plurality of fixed transceiver stations within its geographic coverage area. Though a wireless device is shown, in some example embodiments device 702 may have a wire connection to network 704.

Device 702 may incorporate one or more communication subsystems such as subsystems 712 and/or 780. Communications subsystem 780 may be a wireless networking communications subsystem, for example, conforming to IEEE 802.71 standards such as 802.71b, 802.71g, and/or 802.71n and/or others. In some example embodiments, subsystem 780 is only present and communications subsystem 712 providing cellular communications is not. In some example embodiments, subsystem 712 may be removably connected to a port of device 702 such as via a USB stick. In an example, communication subsystem 712 includes a receiver 714, a transmitter 716, and associated components, such as one or more antenna elements (718 and 720), local oscillators (LOs) 722, and a processing module such as a digital signal processor (DSP) 724. In one example embodiment, antenna elements (718 and 720) may be embedded or internal to device 702. As will be apparent to those skilled in the field of communications, the particular design of the communication subsystem 712 depends on the network 704 in which device 702 is intended to operate.

Device 702 may send and receive communication signals over the network 704 after network registration or activation procedures have been completed. Signals received (e.g. by antenna elements 718) through network 704 are input to receiver 714, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed in DSP 724. In a similar manner, signals to be transmitted are processed, including modulation and encoding, for example, by DSP 724. These DSP-processed signals are input to transmitter 716 for digital-to-analog (D/A) conversion, frequency up conversion, filtering, amplification, and transmission to the network 704 via antenna 720. DSP 724 processes communication signals and provides for receiver and transmitter control. For example, the gains applied to communication signals in receiver 714 and transmitter 716 may be adaptively controlled through automatic gain control algorithms implemented in DSP 724.

Network access (WAN) may be associated with a subscriber or user of device 702 via a memory module, such as a memory module 730, which may be a Subscriber Identity Module (SIM) card for use in a GSM network or a USIM card for use in a UMTS. The SIM card is inserted in or connected to an interface 732 of device 702 in order to operate in conjunction with network 704. Alternatively, device 702 may have an integrated identity module for use with systems such as Code Division Multiple Access (CDMA) systems. Device 702 may include a Wi-Fi transceiver 780 that may include similar components/chipsets to communication subsystem 712 adapted for one or more Wi-Fi protocols. Though Wi-Fi is shown, WiMAX is one alternative transceiver. In some example embodiments, device 702 may be capable of Wi-Fi and WiMAX communications in accordance with software-defined radio ("cognizant radio") techniques. Device 702 may also include GPS capabilities through one or more of its antenna.

Device 702 also includes a battery interface 736 for receiving one or more battery 738 which may be rechargeable. The one or more battery 738 provides electrical power to at least some of the electrical circuitry in device 702, and battery interface 736 provides a mechanical and electrical connection for the one or more battery 738. Battery interface 736 is connected to a regulator (not shown) which provides power V+ to the circuitry of device 702.

Device 702 includes a programmable processor (e.g. microprocessor 740) which controls the overall operation of device 702. Communication functions, including at least data and voice communications, are performed through the communication subsystem 712. Microprocessor 740 also interacts with additional device subsystems such as a display 742, a flash memory 744, a random access memory (e.g. RAM 746), a read-only memory (e.g. ROM 748), input/output (I/O) subsystems, interfaces or ports 710 (e.g. an audio port for connecting to a set of headphones and/or a remote microphone, an High-Definition Multimedia Interface (HDMI), composite video, component video, S-Video, etc, a Universal Serial Bus (USB) or Ethernet port), a keyboard or keypad 754, a speaker 756, a microphone 758, a clickable thumbwheel, trackball, optical or other touch or gesture based input pad, or set of scroll buttons, etc. 760, typically for scrolling/selecting input, one or more short-range communications subsystems 762, and any other device subsystems generally designated as 764. Keypad 754 may be either a complete alphanumeric keypad or telephone-type keypad. Some of the subsystems shown in FIG. 7 perform communication-related functions, whereas other subsystems may provide "resident" or on-device functions.

Some subsystems, such as keypad 754, display 742, and input device 760, for example, may be used for communication-related functions, such as entering a text message for transmission over network 704, and executing device-resident functions such as a calculator or task list, media play back, Internet browsing, etc. Operating system software and other software used by the microprocessor 740 is preferably stored in a persistent store such as flash memory 744, which may alternatively be ROM 748 or similar storage element. Those skilled in the art will appreciate that the operating system, specific device applications, or parts thereof, may be temporarily loaded into a volatile store such as RAM 746. Memory 202 of FIG. 2 may be defined from anyone or more of 744, 746 and 748 as well as other persistent storage (not shown).

Microprocessor 740, in addition to its operating system functions, enables execution of software applications on device 702. A predetermined set of applications that control basic device operations, including data and voice communication applications, will normally be installed on device 702 during or after manufacture. One or more memory stores may be available on device 702 to facilitate storage of information, such as flash memory 744, RAM 746, ROM 748, memory module 730, or other types of memory storage devices or FLASH memory cards represented by other device subsystems 764, such as Secure Digital (SD) cards, mini SD cards, micro SD cards, etc.

As noted above with reference to FIG. 2, device 702 may be configured with a browser for interacting with Web pages. Device 702 may have one or more media related applications for displaying images, playing audio and or video files/streams, etc. The browser and/or media applications often have the ability to send and receive data items via either network 704 or a link to a computer system. The link to the computer system may be via serial port (e.g. 710) or short-range communications subsystem 762. Additional applications may also be loaded onto device 702 through network 704, auxiliary I/O subsystems/interfaces/ports 710, short-range communications subsystem 762, or possibly, other device subsystems 764, and installed by a user in RAM 746 or a non-volatile store such as ROM 748 for execution by microprocessor 740. Such flexibility in application installation increases the functionality of device 702 and may provide enhanced on-device functions, communication-related functions, or both. For example, secure communication applications may enable electronic commerce functions and other such financial transactions to be performed using device 702.

A serial port (e.g. 710) is often implemented (e.g. in a personal digital assistant (PDA) type communication device for which synchronization or other communication with a user's computer is a useful, but optional, component). A serial port enables a user to set preferences through an external device or software application and extends the capabilities of device 702 by providing for information, media file, or software downloads to or uploads from device 702 other than through network 704. It may also accept other communication devices such as radio and IR dongles.

Short-range communications subsystem 762 is an additional component which provides for communication between device 702 and different systems or devices, which need not necessarily be similar devices. For example, short-range communications subsystem 762 may include an infrared (IR) device and associated circuits and components, or a wireless bus protocol compliant communication mechanism such as a Bluetooth communication module to provide for communication with similarly-enabled systems and devices. Device 702 may be configured to pair with other Bluetooth compliant devices for establishing communications.

Short-range communications may include NFC for payment technologies.

One or more embodiments have been described by way of example. It will be apparent to persons skilled in the art that a number of variations and modifications can be made. The scope of the claims should not be limited by the embodiments set forth in the examples, but should be given the broadest interpretation consistent with the description as a whole.

What is claimed is:

1. A computer implemented method of alerting unopened items in communications comprising:
    sending electronically on behalf of a sender communication device for delivery to a recipient communication device a communication having referenced in the communication at least one item to be opened, the at least one item selected from one of: attachments, and references to external resources;
    tracking whether the at least one item is opened; and
    in response to a trigger, alerting, via the sender communication device, that one or more items sent for delivery to the recipient communication device remain unopened.

2. The method of claim 1 comprising sending electronically for delivery to the recipient communication device a reminder communication to open said items remaining unopened.

3. The method of claim 1 wherein the trigger is one of:
    a meeting reminder for a meeting between a contact associated with the sender communication device and a contact associated with the recipient communication device; and
    a search for whether any of the at least one item remains unopened.

4. The method of claim 3 comprising setting the meeting reminder.

5. The method of claim 1 comprising sending the communication on behalf of the sender communication device for delivery to multiple recipient communication devices and wherein the tracking tracks whether the at least one item is respectively opened by each of the recipient communication devices.

6. The method of claim 1 comprising:
    sending to the recipient communication device a plurality of items to be opened in a plurality of communications, the at least one item selected from one of: attachments, and
    references to external resources and the at least one item being referenced in the communications; and
    tracking whether the plurality of items are respectively opened.

7. The method of claim 1 comprising determining the items to be opened from the communication.

8. The method of claim 1 wherein tracking comprises updating a status of a respective one of said at least one item in response to receiving a status update message.

9. The method of claim 1 wherein the communication comprises a meeting invite message.

10. A communication device comprising a processor, a memory and a communications sub-system, the memory storing instructions and data for configuring the processor to:
    send electronically on behalf of a sender communication device for delivery to a recipient communication device a communication having referenced in the communication at least one item to be opened, wherein the at least one item is selected from one of:
    attachments, and references to external resources;
    track whether the at least one item is opened; and
    in response to a trigger, alert via the sender communication device that one or more items sent for delivery to the recipient communication device remain unopened.

11. A non-transitory computer readable memory having recorded thereon instructions for configuring a processor of a communication device, when executed, to:
    send electronically on behalf of a sender communication device for delivery to a recipient communication device a communication having referenced in the communication at least one item to be opened, wherein the at least one item is selected from one of:
    attachments, and references to external resources;
    track whether the at least one item is opened; and
    in response to a trigger, alert via the sender communication device that one or more items sent for delivery to the recipient communication device remain unopened.

12. A computer implemented method of alerting unopened items in communications comprising:
    receiving electronically a communication delivered on behalf of a sender communication device having referenced in the communication at least one item to be opened by a recipient communication device, wherein the at least one item is selected from one of: attachments, and references to external resources;
    tracking whether the at least one item is opened; and
    in response to a trigger, alerting, via the recipient communication device, that one or more items remaining unopened.

13. The method of claim 12 comprising receiving electronically a reminder communication to open said items remaining unopened.

14. The method of claim 12 wherein the trigger is one of:
    a meeting reminder for a meeting between a contact associated with the sender communication device and a contact associated with the recipient communication device;
    a telephone call from a contact associated with the sender communication device; and
    a search for whether any of the at least one item remains unopened.

15. The method of claim 14 comprising setting the meeting reminder.

16. The method of claim 12 comprising:
    receiving from the sender communication device a plurality of items to be opened by the recipient communication device in a plurality of communications; and
    tracking whether the plurality of items are respectively opened.

17. The method of claim 12 comprising determining the items to be opened from the communication.

18. The method of claim 12 wherein tracking comprises opening a respective one item of said at least one item and updating a status of the respective one item in response to the opening.

19. The method of claim 18 comprising sending electronically a status message for the respective one item for updating a respective status tracked for the sender communication device.

20. The method of claim 12 wherein the communication comprises a meeting invite message.

21. A communication device comprising a processor, a memory and a communications sub-system, the memory storing instructions and data for configuring the processor to:

receive electronically a communication delivered on behalf of a sender communication device having referenced in the communication at least one item to be opened by a recipient communication device, wherein the at least one item is selected from one of: attachments, and references to external resources;

track whether the at least one item is opened; and in response to a trigger, alert, via the recipient communication device, that one or more items remaining unopened.

22. A non-transitory computer readable memory having recorded thereon instructions for configuring a processor of a communication device, when executed, to:

receive electronically a communication delivered on behalf of a sender communication device having referenced in the communication at least one item to be opened by a recipient communication device, wherein the at least one item is selected from one of: attachments, and references to external resources;

track whether the at least one item is opened; and in response to a trigger, alert, via the recipient communication device, that one or more items remaining unopened.

* * * * *